United States Patent
Lang et al.

(10) Patent No.: US 8,679,691 B2
(45) Date of Patent: Mar. 25, 2014

(54) INJECTOR OPENING DELAY DIAGNOSTIC STRATEGY

(75) Inventors: Matthew A. Lang, Churchville, NY (US); Nathan Baader, Hemlock, NY (US)

(73) Assignee: GM Global Technology Operations LLC, Detroit, MI (US)

(*) Notice: Subject to any disclaimer, the term of this patent is extended or adjusted under 35 U.S.C. 154(b) by 370 days.

(21) Appl. No.: 13/204,012

(22) Filed: Aug. 5, 2011

(65) Prior Publication Data

US 2013/0034788 A1 Feb. 7, 2013

(51) Int. Cl.
*H01M 8/04* (2006.01)
*H01M 8/24* (2006.01)
*H01J 7/04* (2006.01)

(52) U.S. Cl.
USPC ........... 429/431; 429/443; 429/444; 429/454; 320/162

(58) Field of Classification Search
USPC ............... 429/431, 443, 444, 454, 513, 432; 123/478; 73/114.09, 37, 114.43; 320/162
See application file for complete search history.

(56) References Cited

U.S. PATENT DOCUMENTS

| | | | | |
|---|---|---|---|---|
| 5,535,621 A | * | 7/1996 | Glidewell et al. | 73/114.49 |
| 2003/0226399 A1 | * | 12/2003 | Clingerman et al. | 73/119 A |
| 2008/0138689 A1 | * | 6/2008 | Leo et al. | 429/34 |
| 2010/0233581 A1 | * | 9/2010 | Katano et al. | 429/513 |
| 2010/0273081 A1 | * | 10/2010 | Ishikawa | 429/443 |

FOREIGN PATENT DOCUMENTS

JP 2008140619 A * 6/2008 .............. H01M 8/04

* cited by examiner

*Primary Examiner* — Kenneth Douyette
(74) *Attorney, Agent, or Firm* — John A. Miller; Miller IP Group, PLC

(57) ABSTRACT

A system and method for detecting an intermittent failure of an injector that injects hydrogen gas fuel into the anode side of a fuel cell stack in a fuel cell system. The method includes operating the injector at a fixed injector pulse width and frequency, which causes the stack to generate a constant current, and therefore, a constant fuel consumption rate. While at a constant current, the injector is commanded to a constant duty cycle and frequency that matches the rate of fuel consumption in the fuel cell system. The resulting fuel pressure feedback is then monitored, and if it diverges from a defined nominal value, either in a constant or oscillatory manner, it can be determined that the injector has an intermittent opening failure. In one embodiment, the determination of the injector failure is performed during a shut-down sequence of the fuel cell system.

16 Claims, 1 Drawing Sheet

INJECTOR OPENING DELAY DIAGNOSTIC STRATEGY

BACKGROUND OF THE INVENTION

1. Field of the Invention

This invention relates generally to a system and method for determining whether an injector that injects hydrogen gas fuel into a fuel cell stack is operating properly and, more particularly, to a system and method for determining whether an injector that injects hydrogen gas fuel into the anode-side of a fuel cell stack is operating properly by determining whether the anode-side pressure significantly varies in response to a constant fuel cell stack current output.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membranes within a fuel cell stack need to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

In one known type of fuel cell system, the hydrogen gas fuel is injected into the anode side of the fuel cell stack by an injector. The injector controls the amount of injected fuel for a particular stack current density based on pulse width modulation (PWM) control signal that controls the opening and closing of the injector.

These types of injectors receive a relatively high pressure gas from a hydrogen storage tank and provide the controlled injection of the hydrogen gas at a pressure suitable for the fuel cell stack. Because of the high pressure of the hydrogen gas provided to the injector, as well as high temperatures associated with the fuel cell stack operation and internal injector friction, it is relatively common for a hydrogen fuel injector to have periodic failures. One common injector failure that is particularly difficult to detect is an intermittent shift in the injector firing time as compared to the leading edge of an injection pulse of the PWM control signal. In other words, when the PWM signal commands the injector to open, there may be some delay in that opening because of the failure, where the controller thinks that the injector is open when it actually is not. In this particular failure mode, the injector fails to open at the specified opening time, which causes the injector open time to be lower than commanded, which could result in less fuel being provided to the stack. Typically, this intermittent failure occurs because the current applied to the injector during the pulse is not sufficient to lift the injector pintle from the seat in the expected amount of time. This could be a result of ice forming in low temperature conditions or injector pintle wear, where the pintle may be cocked within the bore and get jammed. Thus, the injector may have additional friction to overcome, causing it to open slower than expected. This will result in a shorter open time, and thus the entire amount of desired fuel will not be provided to the stack.

Conventional injector diagnostic techniques are not typically useful in determining this failure because these types of failures tend to be intermittent, meaning not every injection event has the failure. Particularly, conventional injector detection failure techniques can only detect when the injector is stuck open or when the injector is stuck closed.

SUMMARY OF THE INVENTION

In accordance with the teachings of the present invention, a system and method are disclosed for detecting an intermittent failure of an injector that injects hydrogen gas fuel into the anode side of a fuel cell stack in a fuel cell system. The method includes operating the injector at a fixed injector pulse width and frequency, which causes the stack to generate a constant current, and therefore, a constant fuel consumption rate. While at a constant current, the injector is commanded to a constant duty cycle and frequency that matches the rate of fuel consumption in the fuel cell system. The resulting fuel pressure feedback is then monitored, and if it diverges from a defined nominal value, either in a constant or oscillatory manner, it can be determined that the injector has an intermittent opening failure. In one embodiment, the determination of the injector failure is performed during a shut-down sequence of the fuel cell system.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for detecting intermittent failures of an injector that injects hydrogen gas fuel into the anode side of a fuel cell stack is merely exemplary in nature, and is in no way intended to limit the invention or its applications or uses.

In one known hydrogen gas fuel injection design for a fuel cell system, the amount of fuel that the system determines is necessary for a particular commanded stack current density is based on the pressure within the anode sub-system. For example, the system monitors the pressure in the anode sub-system, and, for a desired stack load, the system sets the injector on time based on the pressure falling below a predetermined pressure for that load and sets the injector off time based on the pressure rising above the desired pressure for that load. The desired injector on and off time is converted to a PWM command signal for the injector having a duty cycle with a particular pulse width and duty cycle. When the injector is operating properly, the injector open time is matched to the desired fuel consumption, which should give a steady pressure reading. If the injector is being intermittently stuck while it is receiving the command signal, that duty cycle will be continually changing because the detected pressure within the anode sub-system will not be at the desired pressure because of the intermittent injector opening failure.

As discussed above, a known technique for controlling the amount of fuel injected into the anode side of a fuel cell stack by a fuel injector is provided by measuring the pressure in the anode sub-system. Particularly, the duty cycle of the injector, including both pulse width and pulse frequency, is set for a particular anode sub-system pressure that will give the amount of fuel necessary for a desired or commanded stack current density. If the injector is not opening and closing properly because of a failure, pressure readings for a particular stack current density would be incorrect and would cause the injector duty cycle to operate more erratically. The erratic opening time also causes injector flow estimations to become incorrect, which can cause model errors elsewhere in the fuel cell system.

The present invention proposes monitoring the pressure in the anode sub-system to detect erratic changes in the duty cycle of the injector to determine that the injector may not be operating properly. In one embodiment, when the erratic pressure reading is detected, the amount of current applied to the injector to open the injector is increased in an attempt to overcome the additional pintle friction and cause the injector to operate properly.

Figure 1:
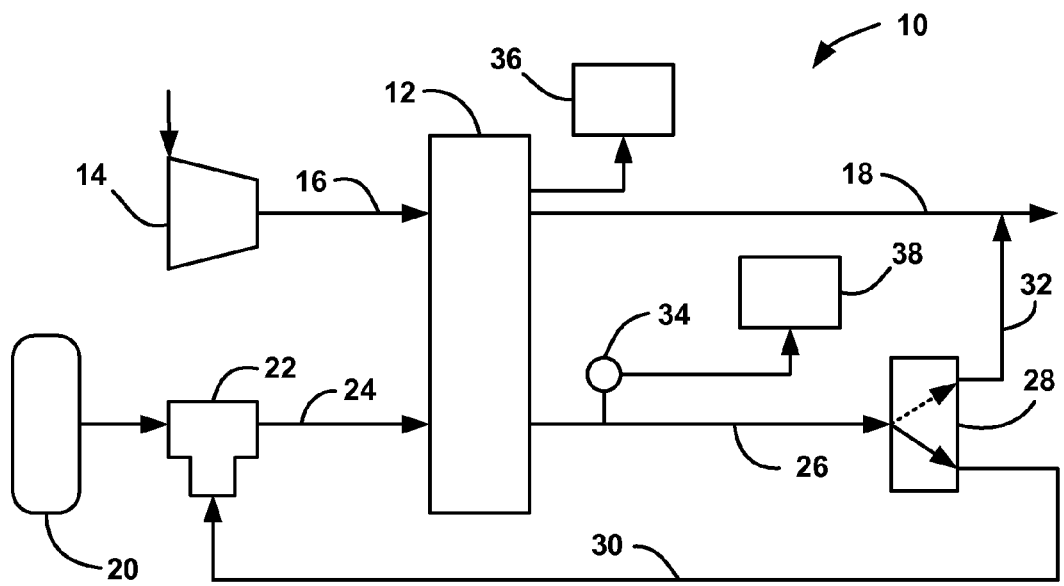
FIG. 1 is a simplified schematic block diagram of a fuel cell system.

FIG. 1 is a simplified schematic block diagram of a fuel cell system 10 including a fuel cell stack 12. The fuel cell system 10 also includes a compressor 14 that provides air on a cathode input line 16 to a cathode side of the fuel cell stack 12, where a cathode exhaust gas is output from the stack 12 on a cathode exhaust gas line 18. The fuel cell system 10 also includes a source 20 of hydrogen gas, typically a high pressure tank, that provides the hydrogen gas to an injector 22 that injects a controlled amount of hydrogen gas on an anode input line 24 to the anode side of the fuel cell stack 12. Although not specifically shown, one skilled in the art would understand that various pressure regulators, control valves, shut-off valves, etc. would be provided to supply the high pressure gas from the source 20 to a pressure suitable for the injector 22. The injector 22 can be any injector suitable for the purposes discussed herein. One suitable example is an injector/ejector, as described in U.S. Pat. No. 7,320,840, titled Combination of Injector-Ejector for Fuel Cell Systems, issued Jan. 22, 2008, assigned to the assignee of this application and incorporated herein by reference.

An anode effluent gas is output from the anode side of the fuel cell stack 12 on anode output line 26, which is provided to a bleed valve 28. As is well understood by those skilled in the art, nitrogen cross-over from the cathode side of the fuel cell stack 12 dilutes the hydrogen in the anode side of the stack 12, thereby affecting fuel cell stack performance. Therefore, it is necessary to periodically bleed the anode effluent gas from the anode sub-system to reduce the amount of nitrogen in the anode sub-system. When the system 10 is operating in a normal non-bleed mode, the valve 28 is in the position where the anode effluent gas is provided to a recirculation line 30 that recirculates the anode gas to the injector 22 to operate it as an ejector and provide recirculated hydrogen back to the anode input of the stack 12. When a bleed is commanded to reduce the nitrogen in the anode side of the stack 12, the valve 28 is commanded to direct the anode effluent gas to a by-pass line 32 that combines the anode effluent gas with the cathode exhaust gas on the line 18, where the hydrogen gas is diluted and is suitable for the environment. A pressure sensor 34 measures the pressure in the anode output line 26, but can be at any location within the anode sub-system to provide an anode side pressure measurement. Although the system 10 is an anode recirculation system, the present invention will have application for other types of fuel cell systems, include anode flow-shifting systems, well understood to those skilled in the art.

When the fuel cell system 10 is shut down, a shut-down sequence is typically performed that puts various system components in a shut-down state so that they are better able to perform their operation at the next system start-up. For example, one known fuel cell system shut-down technique includes providing a stack purge where air is forced through the cathode side flow channels in the fuel cell stack 12 and hydrogen gas is forced through the anode side flow channels in the stack 12 to remove the accumulation of water in the flow channels that may freeze during the system shut-down and cause problems on the next start-up. Typically, the stack current that is generated during the shut-down mode and stack purge is used to recharge a high voltage battery 36 in the fuel cell system 10 because that current is not needed for other operations, and would otherwise be wasted.

For this type of shut-down sequence, the present invention proposes operating the fuel cell stack 12 at a constant current so the injector pulse width and frequency can be commanded to constant values, and likewise, the pressure reading from the pressure sensor 34 would be constant if the system is operating properly. Therefore, the opening and closing of the injector 22 would be fixed, the amount of current available to charge the battery 36 would be constant and the pressure in the anode sub-system would be constant during the shut-down sequence. If the pressure reading is not constant under these conditions, then the system 10 can assume that the injector 22 has an intermittent opening delay which means that it is not opening at the rise of the pulse commanding the injector 22 to open. The system 10 includes a processor 38 that performs and controls the various operations being discussed herein.

Figure 2:
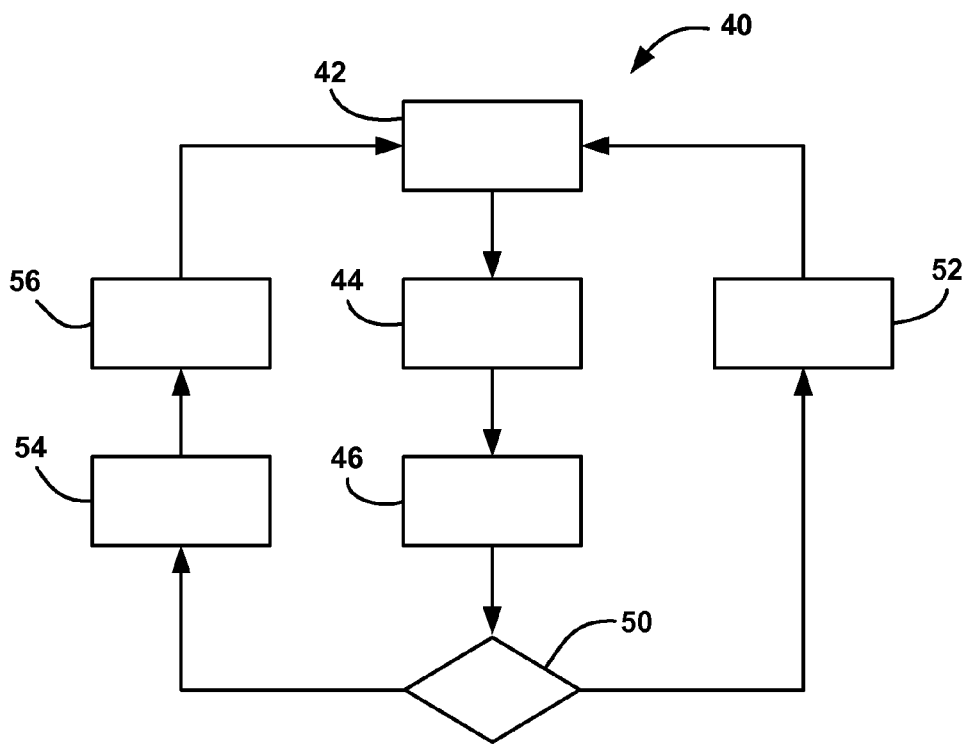
FIG. 2 is a flow chart diagram showing a process for detecting injector failure in the fuel cell system.

FIG. 2 is a flow chart diagram 40 showing a process for detecting an improperly operating injector and correcting the operation of the injector if a failure is detected. At box 42, the algorithm determines whether the system 10 has transitioned from a normal run mode to a shut-down mode at vehicle key off. If the algorithm does detect this transition, then the algorithm sets the proper compressor flow rate for the airflow to the cathode side of the stack 12 and the proper or desired injector pulse width and frequency for operating the injector 22 for the anode side of the fuel cell stack 12 to provide a desired constant stack current for charging the battery during the shut-down sequence at box 44. Once the constant stack current has been commanded and is being generated by the stack 12, the algorithm monitors the pressure measurements from the pressure sensor 34 at box 46, and compares those pressure measurements to a predetermined pressure calibration value at decision diamond 50. If the pressure measurements are at steady state or constant and do not exceed the pressure calibration value at the decision diamond 50, then the injector 22 is operating properly at box 52, and the algorithm returns to the box 42 to wait for the next transition from the run mode to the shut-down mode.

If the algorithm determines that the pressure measurements are erratic and are exceeding the calibration pressure value at the decision diamond 50, then the algorithm identifies a possible injector problem at box 54. The algorithm can immediately indicate an injector failure or can increment a failure counter, where the failure is not identified until the counter reaches a predetermined value, such as three counts. Whether the potential failure is specifically identified to the vehicle driver or not, the algorithm increases the amount of current at box 56 by a predetermined amount that will be provided to the injector 22 to cause it to open for the PWM command signal for the next run mode, and returns to the box 42 to wait for the next transition from the run mode to the shut-down mode. Thus, when the system 10 is started the next time, the amount of current that will be used to operate the injector 22 will be higher than the last time the system 10 was operational, which may cause the injector 22 to operate properly.

When the next shut-down mode is detected at the box 42, the system 10 will go through the same operation to determine if the injector 22 has an intermittent opening failure at the new injector current, and will again increase the injector current at the box 56 to be more than the previously increased current if the failure is again detected. As mentioned above, the algorithm may increase the current at subsequent shut-downs three times before it will provide a warning to the vehicle driver that the injector 22 needs to be replaced. It is noted that the increase in the current provided to the injector 22 at the box 56 is not decreased to the original current, where once the injector current is increased it is maintained at that increased value until it is increased again or the failure detection is issued.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting whether an injector that injects hydrogen gas into an anode side of a fuel cell stack in a fuel cell system is operating properly, said method comprising:
   operating the injector at a fixed injector pulse width and frequency so as to cause the stack to generate a constant current;
   monitoring pressure in an anode sub-system of the fuel cell system while the stack is generating the constant current; and
   determining that the injector is not operating properly if pressure measurements from monitoring the pressure in the anode sub-system indicate that the pressure is exceeding a predetermined pressure value.

2. The method according to claim 1 further comprising increasing an injector current by a predetermined amount that controls an operation of the injector if it is determined that the injector is not operating properly.

3. The method according to claim 2 further comprising determining whether the injector is operating properly based on whether the anode sub-system pressure goes above the predetermined calibration pressure after the injector current has been increased, and increasing the injector current again by a predetermined amount if it is determined that the injector is still not operating properly.

4. The method according to claim 3 further comprising only increasing the injector current three times and if it is determined that the injector is still not operating properly, issuing a warning signal.

5. The method according to claim 1 further comprising determining that the fuel cell system has transitioned from a run mode to a shut-down mode before operating the injector at a fixed injector pulse width and frequency.

6. The method according to claim 1 further comprising using the constant current to charge a system battery.

7. A method for detecting whether an injector that injects hydrogen gas into an anode side of a fuel cell stack in a fuel cell system is operating properly, said method comprising:
   determining whether the fuel cell system has transitioned from a run mode to a shut-down mode;
   operating the injector at a fixed injector pulse width and frequency so as to cause the stack to generate a constant current if the fuel cell system has transitioned from a run mode to a shut-down mode;
   monitoring pressure in an anode sub-system of the fuel cell system while the stack is generating the constant current;
   determining that the injector is not operating properly if pressure measurements from monitoring the pressure in the anode sub-system indicate that the pressure is exceeding a predetermined pressure value; and increasing an injector current by a predetermined amount that controls operation of the injector if it is determined that the injector is not operating properly.

8. The method according to claim 7 further comprising determining whether the injector is operating properly based on whether the anode sub-system pressure goes above the predetermined calibration pressure after the injector current has been increased, and increasing the injector current again by a predetermined amount if it is determined that the injector is still not operating properly.

9. The method according to claim 8 further comprising only increasing the injector current three times and if it is determined that the injector is still not operating properly, issuing a warning signal.

10. The method according to claim 7 further comprising using the constant current to charge a system battery.

11. A detection system for detecting whether an injector that injects hydrogen gas into an anode side of a fuel cell stack in a fuel cell system is operating properly, said detection system comprising:
  means for operating the injector at a fixed injector pulse width and frequency so as to cause the stack to generate a constant current;
  means for monitoring pressure in an anode sub-system of the fuel cell system while the stack is generating the constant current; and
  means for determining that the injector is not operating properly if pressure measurements from monitoring the pressure in the anode sub-system indicate that the pressure is exceeding a predetermined pressure value.

12. The detection system according to claim 11 further comprising means for increasing an injector current by a predetermined amount that controls an operation of the injector if it is determined that the injector is not operating properly.

13. The detection system according to claim 12 further comprising means for determining whether the injector is operating properly based on whether the anode sub-system pressure goes above the predetermined calibration pressure after the injector current has been increased, and increasing the injector current again by a predetermined amount if it is determined that the injector is still not operating properly.

14. The detection system according to claim 13 further comprising means for only increasing the injector current three times and if it is determined that the injector is still not operating properly, issuing a warning signal.

15. The detection system according to claim 11 further comprising means for determining that the fuel cell system has transitioned from a run mode to a shut-down mode before operating the injector at a fixed injector pulse width and frequency.

16. The detection system according to claim 11 further comprising means for using the constant current to charge a system battery.

* * * * *